J. V. Dinsmore,

Metallic Heel.

No. 311. A. I. Patented Jan 15, 1861.

Witnesses:
Goodwin G. Abbe
Chas Mason

Inventor:
J. V. Dinsmore

N. PETERS, PHOTO-LITHOGRAPHER, WASHINGTON, D. C.

UNITED STATES PATENT OFFICE.

J. V. DINSMORE, OF AUBURN, MAINE.

IMPROVEMENT IN METALLIC HEELS FOR BOOTS AND SHOES.

Specification of Additional Improvement No. 311, dated January 15, 1861, forming a part of Letters Patent No. 27,702, dated April 3, 1860.

*To all whom it may concern:*

Be it known that I, J. V. DINSMORE, of Auburn, in the county of Androscoggin and State of Maine, have invented a new and useful improvement upon an invention secured to me by Letters Patent dated on the 3d day of April, 1860, and entitled an Improvement in Metallic Heels for Boots and Shoes; and I do hereby declare that the following is a full, clear, and exact description of my present invention, reference being had to the accompanying drawings, and to the letters of reference marked thereon.

The nature of my invention consists in providing a plate of hardened steel, which is attached to the metallic heel to prevent it from wearing rapidly away. This plate is so constructed that it can readily be exchanged from the right to the left boot, and vice versa, so that when the outer sides become most worn, as is often the case, the plates may be interchanged, so as to bring the outer sides the highest, and thus preserve the heels sufficiently level to prevent the boot from running down or inclining permanently outward. I also propose to place underneath this steel plate a washer of india-rubber or other elastic substance to deaden the sound of the heel when walking over pavements or other hard surfaces.

Figure 1:
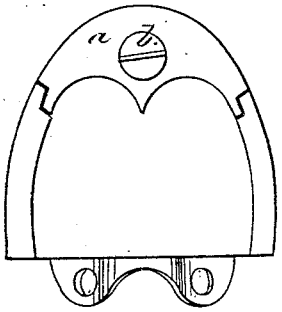
Figure 2:
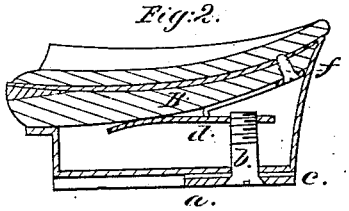
Figure 3:
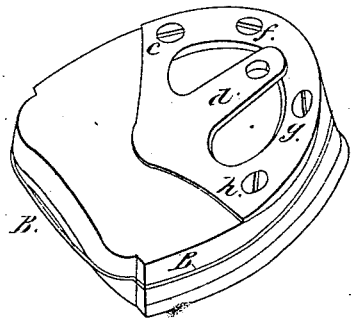

Figure 1 shows the under surface of the heel. Fig. 2 is a section of the heel. Fig. 3 shows the general form of a spring used in attaching the metallic heel with its plate of steel to the boot, as seen in perspective.

*a* is the steel plate held fast to the heel by the screw *b*, which also holds the rear portion of the heel fast to the boot.

*c* is the washer, of rubber, which is made superficially coextensive with the plate *a*.

*d* is a spring which performs the same function as the spring C in my originally patented invention. I prefer the form for that spring now shown, as it permits the heel-screw *b* to be placed farther back, in order that it may be in a better position to hold the plate *a* without making that plate inconveniently broad. It is held fast to the under heel by screws at *e f g h*.

The plate *a* is made perfectly symmetrical on each side of the screw *b*, so that it can be readily changed from one boot to the other for the purpose above stated.

The plate B used in my original patent is not indispensable in this arrangement. If the leather into which the screws *e*, *f*, *g*, and *h* are made to penetrate is of good quality, the spring will be sufficiently firm without the use of any metallic plate.

The invention in all other respects will be sufficiently understood by reference to the original patent.

Having thus described my invention, what I claim as new, and desire to secure by Letters Patent as an additional improvement upon my patent of April 3, 1860, is—

The use of a steel plate so attached to the metallic heel as to be capable of being readily changed from one boot to the other, in the manner and for the purpose specified.

J. V. DINSMORE.

Witnesses:
GOODWIN Y. ATLEE,
CHAS. MASON.